(12) United States Patent
Hayes et al.

(10) Patent No.: US 11,438,324 B2
(45) Date of Patent: *Sep. 6, 2022

(54) CRYPTOGRAPHICALLY TRANSMITTING AND STORING IDENTITY TOKENS AND/OR ACTIVITY DATA AMONG SPATIALLY DISTRIBUTED COMPUTING DEVICES

(71) Applicant: Allstate Insurance Company, Northbrook, IL (US)

(72) Inventors: Howard Hayes, Glencoe, IL (US); Jason D. Park, Chicago, IL (US); John S. Parkinson, Burlington, VT (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/985,724

(22) Filed: Aug. 5, 2020

(65) Prior Publication Data

US 2020/0366664 A1 Nov. 19, 2020

Related U.S. Application Data

(63) Continuation of application No. 15/817,930, filed on Nov. 20, 2017, now Pat. No. 10,764,270.

(51) Int. Cl.
*H04L 9/32* (2006.01)
*H04L 9/40* (2022.01)
*H04W 12/63* (2021.01)

(52) U.S. Cl.
CPC ........ *H04L 63/0807* (2013.01); *H04L 9/3213* (2013.01); *H04L 9/3231* (2013.01);
(Continued)

(58) Field of Classification Search
CPC . H04L 63/0807; H04L 9/3213; H04L 9/3231; H04L 9/3236; H04L 9/3239;
(Continued)

(56) References Cited

U.S. PATENT DOCUMENTS 6,213,391 B1 4/2001 Lewis
8,312,157 B2 11/2012 Jakobsson et al.
(Continued)

FOREIGN PATENT DOCUMENTS

CN 105701372 A 6/2016
CN 107257340 A 10/2017

OTHER PUBLICATIONS

"Biometrics: a stronger digital identity, via your mobile phone" http://www.morpho.com/en/media/20160728_biometrics-stronger-digital-identity-your-mobile-phone websited visited Sep. 29, 2016 pp. 1-3.
(Continued)

*Primary Examiner* — Trong H Nguyen
(74) *Attorney, Agent, or Firm* — Brooks Kushman P.C.

(57) ABSTRACT

Aspects of the disclosure relate to a system and method for cryptographically transmitting and storing identity tokens and/or activity data among spatially distributed computing devices. The system may comprise a plurality of chains, such as an identity chain and an activity chain. In some aspects, identity data associated with a user may be used to generate an identity token for the user. The identity token may be transmitted to a plurality of computing devices for verification. Based on a verification of the identity token, the identity token may be stored in the identity chain. A request to perform an activity may also be received, and identity data associated with the user may be received in order to authenticate the user.

20 Claims, 8 Drawing Sheets

(52) U.S. Cl.
CPC .......... *H04L 9/3236* (2013.01); *H04L 9/3239* (2013.01); *H04L 9/3247* (2013.01); *H04L 63/08* (2013.01); *H04L 63/083* (2013.01); *H04L 63/0861* (2013.01); *H04W 12/63* (2021.01); *H04L 63/12* (2013.01); *H04L 2209/38* (2013.01)

(58) Field of Classification Search
CPC ..... H04L 9/3247; H04L 63/08; H04L 63/083; H04L 63/0861; H04L 63/12; H04L 2209/38; H04L 63/0823; H04W 12/069
See application file for complete search history.

(56) References Cited

U.S. PATENT DOCUMENTS

| | | | |
|---|---|---|---|
| 8,433,919 B2 | 4/2013 | Giobbi et al. | |
| 8,731,195 B2 | 5/2014 | Raman et al. | |
| 9,055,061 B2 | 6/2015 | Israel | |
| 9,240,010 B2 | 1/2016 | Aidasani et al. | |
| 9,253,181 B2 | 2/2016 | Liu et al. | |
| 9,294,279 B2 | 3/2016 | Buer et al. | |
| 9,323,912 B2 | 4/2016 | Schultz et al. | |
| 9,426,151 B2 | 8/2016 | Richards et al. | |
| 9,577,894 B1* | 2/2017 | Hadar | H04L 67/00 |
| 2002/0129251 A1 | 9/2002 | Itakura et al. | |
| 2005/0137889 A1* | 6/2005 | Wheeler | G07F 7/1008 705/65 |
| 2008/0289020 A1 | 11/2008 | Cameron et al. | |
| 2011/0142234 A1 | 6/2011 | Rogers | |
| 2012/0072350 A1 | 3/2012 | Goldthwaite et al. | |
| 2013/0282589 A1 | 10/2013 | Shoup et al. | |
| 2015/0035643 A1 | 2/2015 | Kursun | |
| 2015/0220918 A1 | 8/2015 | Davis et al. | |
| 2016/0012465 A1 | 1/2016 | Sharp | |
| 2016/0072800 A1 | 3/2016 | Soon-Shiong et al. | |
| 2016/0087957 A1* | 3/2016 | Shah | H04L 63/08 726/1 |
| 2017/0132630 A1 | 5/2017 | Castinado et al. | |
| 2017/0177855 A1* | 6/2017 | Costa Faidella | H04L 9/3236 |
| 2017/0243213 A1* | 8/2017 | Castinado | G06Q 20/38215 |
| 2017/0250972 A1 | 8/2017 | Ronda et al. | |
| 2018/0219671 A1* | 8/2018 | Velissarios | H04L 9/3247 |
| 2018/0288041 A1* | 10/2018 | Zavesky | H04L 63/0815 |
| 2018/0302222 A1* | 10/2018 | Agrawal | G06F 21/604 |
| 2019/0130387 A1* | 5/2019 | Arora | G06Q 30/0207 |
| 2019/0268466 A1* | 8/2019 | Inoue | H04L 9/3239 |

OTHER PUBLICATIONS

"Data Security for Every Organization" Vasco https://www.vasco.com/ website visited Sep. 29, 2016 pp. 1-10.
Kim, Jae-Jung et al. "A Method of Risk Assessment for Multi-Factor Authentication", Journal of Information Processing Systems, vol. 7, Issue 1, pp. 187-198, http://www.koreascience.or.kr/article/ArticleFullRecord.jsp?cn=E1JBB0_2011_V7n1_187 2011.
"Bitcoin Biometrics & Blockchain Security" https://www.hypr.com/biometric-bitcoin-blockchain/ website visited Sep. 29, 2016, pp. 1-7.
Estevao, Patricia, "What is Proof of Work (PoW)?" https://www.bitcoinmining.com/what-is-proof-of-work/ website visited Oct. 5, 2017 pp. 1-4.
Cawrey, Daniel "How Consensus Algorithms Solve Issues with Bitcoin's Proof of Work" https://www.coindesk.com/stellar-ripple-hyperledger-rivals-bitcoin-proof-work/ Sep. 11, 2014, pp. 1-7.
"Bitcoin Developer Guide" https://bitcoin.org/en/developer-guide#block-height-and-forking website visited Oct. 5, 2017, pp. 1-56.
Krzyzanowski, Paul "Consensus Reaching agreement" https://www.cs.rutgers.edu/~pxk/417/notes/content/consensus.html Oct. 2011, pp. 1-8.
"Can someone explain how the Bitcoin Blockchain works?" https://bitcoin.stackexchange.com/questions/12427/can-someone-explain-how-the-bitcoin-blockchain-works/13347#13347 website visited Oct. 5, 2017, pp. 1-5.
"Making Blockchain Real for Business Explained" https://IBM.box.com/BlockExp V2.09 Jan. 19, 2016, IBM, pp. 1-35.
Nakamoto, Satoshi "Bitcoin: A Peer-to-Peer Electronic Cash System" www.bitcoin.org, pp. 1-9, website visted Nov. 10, 2017.
Lewis, Antony, "A Gentle Introduction To Blockchain Technology", Brave New Coin Digital Currency Insights, https://bravenewcoin.com/industry-resources/reference-papers/series-1/ website visited Nov. 10, 2017, pp. 1-18.
"Bitcoin Mining Explained Like You're Five: Part 2—Mechanics" https://chrispacia.wordpress.com/2013/09/02/bitcoin-mining-explained-like-youre-five-part-2-mechanics/ website visited Oct. 5, 2017, pp. 1-15.
Jan. 16, 2018—(WO) International Search Report and Written Opinon—App PCT/US18/57958.
Dec. 10, 2019 U.S. Non-Final Office Action—U.S. Appl. No. 15/817,930.
Apr. 29, 2020—U.S. Notice of Allowance—U.S. Appl. No. 15/817,930.
Jul. 13, 2021—(EP) Extended Search Report—App. No. 18877378.2.
Jun. 18, 2021—(CA) Office Action—App. No. 3082338.
Canadian Office Action dated Jun. 17, 2022 regarding Canadian Patent Application No. 3,082,338, 6 pgs.

* cited by examiner

CRYPTOGRAPHICALLY TRANSMITTING AND STORING IDENTITY TOKENS AND/OR ACTIVITY DATA AMONG SPATIALLY DISTRIBUTED COMPUTING DEVICES

CROSS-REFERENCE TO RELATED APPLICATIONS

This application is a continuation of U.S. patent application Ser. No. 15/817,930, filed Nov. 20, 2017, now U.S. Pat. No. 10,764,270, which is incorporated herein by reference in its entirety.

TECHNICAL FIELD

Aspects of the disclosure generally relate to cryptographically transmitting and storing identity tokens and/or activity data among spatially distributed computing devices.

BACKGROUND

Trusted third party devices are often used to authenticate a computing device or a user of the computing device. For example, the trusted third party device may be used to vouch for the identity of the user if the user provides the third party device with appropriate information (e.g., username/password, PIN code, government ID, etc.). Once the trusted third party device authenticates the computing device or user thereof, the user may be granted permission to perform one or more activities, such as interacting with other computing devices or users thereof. However, various technological problems may exist with using trusted third party devices to authenticate users. For example, the trusted third party device may fail or go offline, and the computing device might not be able to perform the requested activities until the third party device is back online. Third party devices also might not be able to properly secure the user's identity. For example, if a bad actor is able to obtain the user's username/password, PIN code, etc., the bad actor may be able to imitate the user and perform activities as the user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a system and method comprising receiving, by a computing device, first identity data associated with a user. The computing device may generate, based on the first identity data associated with the user, a first identity token for the user. The computing device may transmit, to a plurality of other computing devices, the first identity token for the user. Based on a verification of the first identity token for the user by one or more of the plurality of other computing devices, the first identity token for the user may be stored in an identity chain. The first identity token for the user may indicate a prior identity token stored in the identity chain. The computing device may receive a request to perform an activity. In response to receiving the request to perform the activity, the computing device may request second identity data associated with the user. The computing device may receive the second identity data associated with the user. The computing device may generate, based on the second identity data associated with the user, a second identity token for the user. Based on a comparison of the second identity token to the first identity token, the user may be authenticated, and an activity token for the activity may be generated. The activity token for the activity may be stored in an activity chain, and the activity token may indicate a prior activity token stored in an activity chain.

In some aspects, generating the first identity token for the user may comprise hashing the first identity data associated with the user to generate a character string. In some aspects, the computing device may encrypt the first identity token for the user, and transmitting the first identity token for the user may comprise transmitting the encrypted first identity token for the user. Verification of the first identity token for the user by one or more of the plurality of other computing devices may be based on a consensus algorithm. The first identity data associated with the user may comprise two or more of device activity data associated with the user, location data associated with the user, or biometric data of the user.

In some aspects, the computing device may receive third identity data associated with the user. The computing device may generate, based on the third identity data associated with the user, a third identity token for the user. The computing device may transmit, to one or more of the plurality of other computing devices, the third identity token for the user. Based on a failure to verify the third identity token for the user by one or more of the plurality of other computing devices, the third identity token for the user may be discarded.

In some aspects, the computing device may transmit, to one or more of the plurality of other computing devices, the activity token for the activity, and storing the activity token for the activity in the activity chain may be based on a verification of the activity token by one or more of the plurality of other computing devices. The computing device and the plurality of other computing devices may form a network of trusted computing devices in some examples.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
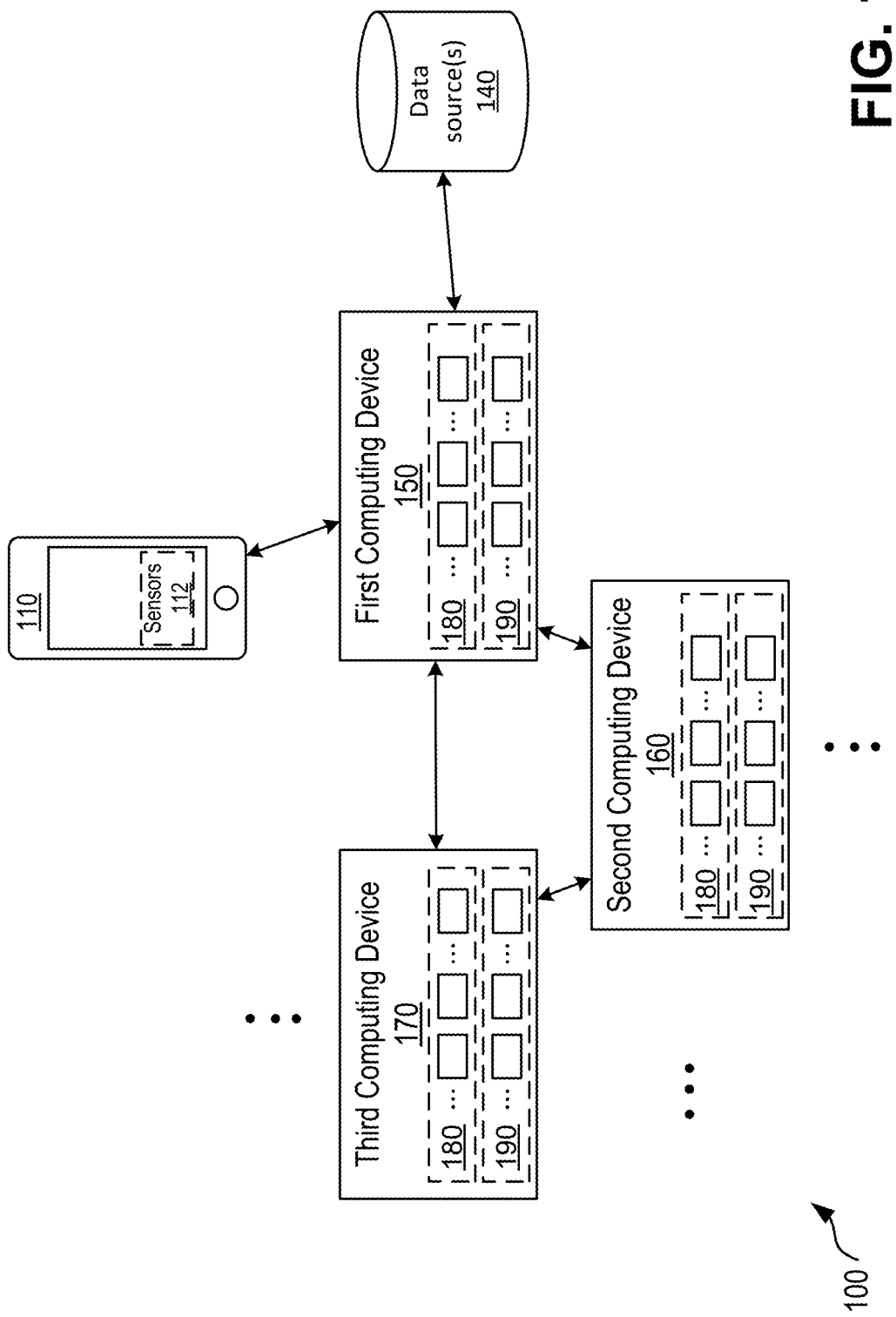
FIG. 1 is a diagram illustrating various example components of a system for cryptographically transmitting and storing identity tokens and/or activity data among spatially distributed computing devices according to one or more aspects of the disclosure.

FIG. 1 is a diagram illustrating various example components of a system 100 for cryptographically transmitting and storing identity tokens and/or activity data among spatially distributed computing devices according to one or more aspects of the disclosure. The system 100 may include one or more sources of data, such as mobile device 110 (e.g., a smartphone, a tablet, and the like) and/or data source(s) 140. The system 100 may also comprise a first computing device 150, a second computing device 160, a third computing device 170, and one or more other computing devices (not illustrated). The computing devices may form a network of computing devices and may communicate via, for example, a peer-to-peer communication protocol.

Each computing device 150, 160, 170, etc. may have a processor for controlling overall operation of the computing device and its associated components, including RAM, ROM, input/output module, and memory. Each computing device, along with one or more additional devices, may correspond to any of multiple systems or devices, configured as described herein for receiving identity data, generating identity tokens based on the identity data, receiving requests to perform activities, and generating activity tokens, among other features. In some aspects, each computing device of the network may store a copy of an identity chain 180 and a copy of an activity chain 190. As will be described in further detail below, the identity chain 180 may store identity tokens for authenticating users of the computing devices, and the activity chain 190 may comprise activity tokens that store confirmed activities by or between users of the computing devices.

Each computing device 150, 160, 170, etc. may include an Input/Output (I/O) module having a microphone, keypad, touch screen, and/or stylus through which a user of the computing device 150, 160, 170, etc. may provide input, and may also include one or more of a speaker for providing audio input/output and a video display device for providing textual, audiovisual and/or graphical output. The computing device may have various sensors for receiving biometric data from the user, such as a fingerprint scanner, a camera with facial recognition software, a DNA sample collector, a microphone for collecting a voiceprint, etc. The biometric data may be used to generate one or more identity tokens for the user of the computing device, as will be described in further detail below. Software may be stored within the memory of the computing device and/or other storage to provide instructions to its processor for enabling the computing device to perform various functions. For example, the computing device's memory may store software used by the computing device, such as an operating system, application programs, and an associated internal or external database. The memory unit may include one or more of volatile and/or non-volatile computer memory to store computer-executable instructions, data, and/or other information. The processor of each computing device and its associated components may allow the computing device to execute a series of computer-readable instructions to cryptographically generate identity tokens and/or activity blocks to be added to their respective chains.

Each computing device 150, 160, 170, etc. may operate in a networked environment supporting connections to one or more other computing devices, such as various other terminals/devices. Each computing device and the related terminals/devices, may communicate with one or more mobile device 110 and/or other data sources 140. For example, the first computing device 150 may communicate with the mobile device 110. Thus, the computing devices and each of their associated terminals/devices may include personal computers (e.g., laptop, desktop, or tablet computers) and/or servers (e.g., web servers, database servers) and may communicate with mobile communication devices (e.g., mobile phones, portable computing devices, and the like). In some aspects, a computing device 150, 160, 170, etc. may comprise a mobile device (e.g., mobile device 110) rather than communicating with the mobile device. In these examples, the network of computing devices 150, 160, 170, etc. may form a mesh of one or more (e.g., a plurality) of mobile devices.

The devices illustrated in system 100 may communicate via network connections depicted such as a local area network (LAN) and a wide area network (WAN), and a wireless telecommunications network, but may also include other networks. When used in a LAN networking environment, the computing devices 150, 160, 170, etc. may be connected to the LAN through a network interface or adapter. When used in a WAN networking environment, each of the computing devices may include a modem or other means for establishing communications over the WAN, such as a network (e.g., the Internet). When used in a wireless telecommunications network, the computing device may include one or more transceivers, digital signal processors, and additional circuitry and software for communicating with wireless computing devices (e.g., mobile phones, vehicles, etc.) via one or more network devices (e.g., base transceiver stations) in the wireless network. It will be appreciated that the network connections shown and described above are illustrative and other means of establishing a communications link between the computers may be used. The existence of any of various network protocols such as TCP/IP, Ethernet, FTP, HTTP and the like, and of various wireless communication technologies such as GSM, CDMA, LTE, Wi-Fi, and WiMAX, is presumed, and the various computing devices and system components described herein may be configured to communicate using any of these network protocols or technologies.

The system 100 may include one or more mobile computing device 110 (e.g., mobile phone, personal digital assistant (PDA), tablet computer, laptop computer, smartwatch, etc.). The mobile computing device 110 may contain some or all of the hardware/software components of the computing devices 150, 160, 170, etc. described above. Alternatively, the mobile computing device 110 may be one of the computing devices 150, 160, 170. Software applications may be installed on and execute on the mobile device 110. The software applications may be configured to receive sensor data from internal sensors 112, such as acceleration, velocity, location, rotation, and the like. The mobile computing device 110 may receive movement information from the sensors 112 to determine, for example, movement patterns of the user (e.g., walking speed, gait, etc.) and/or locations that the user has visited. For example, mobile device 110 equipped with Global Positioning System (GPS) functionality may determine the user's locations. The location of the mobile device 110 and user may also be determined based on wireless networks the mobile device has connected to, such as Wi-Fi networks, cellular networks, and the like.

The sensors 112, when the mobile device 110 is inside of a vehicle, may be used to determine vehicle location, speed, direction and other driving data. The mobile computing device 110 may store, analyze, and/or transmit the vehicle data to one or more other computing devices. For example, mobile device 110 may transmit vehicle data directly to the computing device 150.

The sensors 112 of the mobile device 110, such as a GPS and/or a compass, may sense the speed and/or direction at which the mobile device 110 and accordingly vehicle 120 is traveling. An accelerometer of the mobile device 110 may sense the acceleration of the mobile device. A gyroscope may be used to determine the orientation of the mobile device. The gyroscope may also be used to measure the speed of rotation of the mobile device 110. A magnetometer may be used to measure the strength and direction of the magnetic field relative to the mobile device. The sensors 112 previously described are exemplary, and the mobile device 110 may include any other sensors used for monitoring user characteristics and other user or driving data.

The system 100 may comprise one or more data source 140, such as an external data source. Each data source 140 may comprise one or more database storing data associated with the user. In some aspects, the driving or non-driving data collected from the mobile computing device 110 may be transmitted to and stored at the external data source 140. The external data source 140 may also store other data associated with the user and not collected from the vehicle or mobile computing devices. Non-limiting examples of data include, for example, a home address or a work address stored in a profile, history information (e.g., the user's contacts, the user's possessions, actions or activities performed by the user, and other history data), profile information (e.g., the user's identification numbers, names, etc.) or any other data describing or otherwise associated with the user. The data may comprise any data the user may use as a basis for one or more identity tokens to be stored in the identity chain. Data from the external data sources 140 may be accessed by the first computing device 150 or the mobile device 110 via, for example, application program interfaces (APIs), databases, software development kits (SDKs), etc.

Aspects of the disclosure generally relate to cryptographically transmitting and storing identity tokens and/or activity data among spatially distributed computing devices. A variety of mechanisms may be used to verify the identity and authenticity (e.g., right to participate) of the computing devices (or users thereof) in a network. In some aspects, a trusted third party for authenticating a user or users might not exist. In the absence of a trusted third party, the authentication of an activity where one or more users prove, for example, both their identity and the ownership of the mechanisms to perform an activity (e.g., a payment mechanism (by the buyer), a payment receipt mechanism (by the seller), or an item of value (by the seller)), before the activity can be completed. In some aspects, blockchain(s) may be used to provide, for example, an immutable data store for unique identity tokens derived from a wide variety of biometric, behavioral, historic or profile data or a verifiable chain of changed token values that can be trusted to be current and correct.

A system described herein may use a plurality of chains to authenticate users and verify activities of the user. In some aspects, the chains may be independent, but information in one chain may be used to confirm information in the other chain(s), as will be described in further detail below. In some aspects, only members of one or more of the chains might have access to the chain and information on the chain (e.g., the blocks or tokens). Each member may also have a copy of the chain(s) and blocks thereof. One chain may comprise an identity chain. Each block of the identity chain may store an identity token, and each identity token may encode identity data for a particular user. Users may have one identity token or multiple identity tokens stored on the identity chain, as will be described in further detail below. The identity tokens may be used to authenticate a user when the user desires to complete an activity. Another chain may be an activity chain. Each block of the activity chain may store an activity token, and each activity token may encode activity information associated with a particular user or a plurality of users (e.g., parties to a transaction).

Figure 2A:
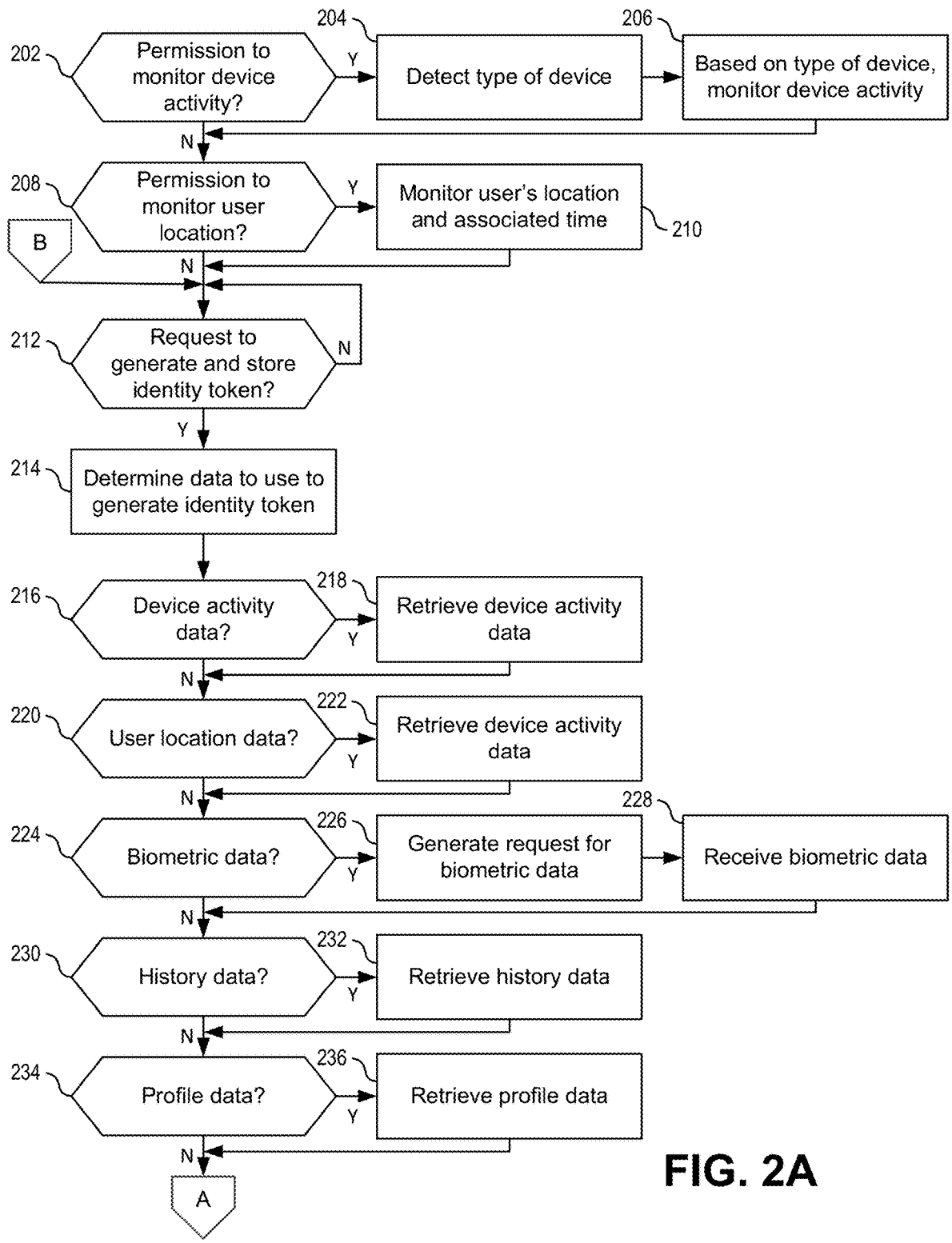
FIGS. 2A-B is a flow diagram illustrating an example method of cryptographically transmitting and storing identity tokens among spatially distributed computing devices according to one or more aspects of the disclosure.
Figure 2B:
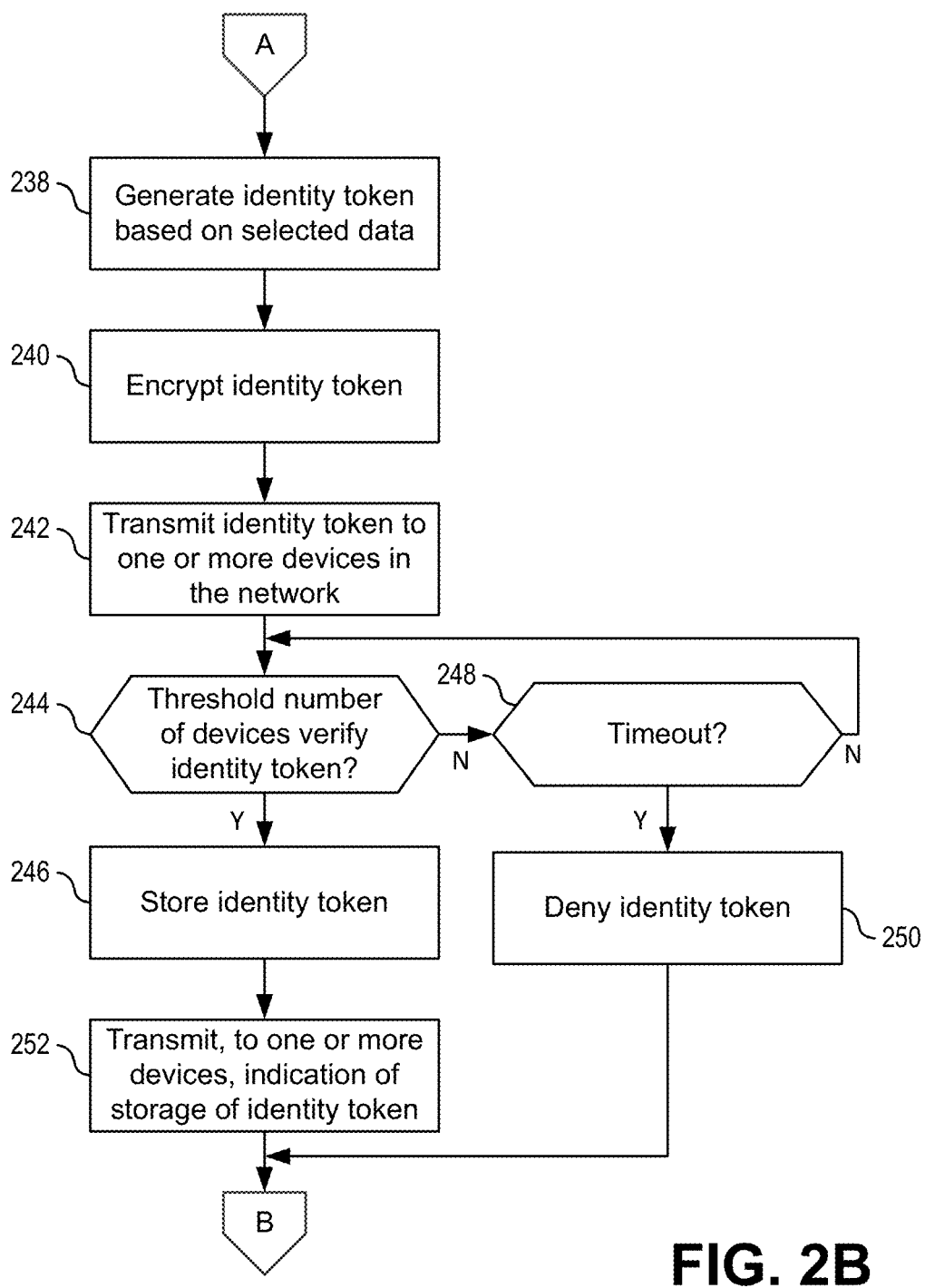

FIGS. 2A-B is a flow diagram illustrating an example method of cryptographically transmitting and storing identity tokens among spatially distributed computing devices according to one or more aspects of the disclosure. The steps illustrated in FIGS. 2A-B may be performed by one or more of the devices illustrated in FIG. 1, such as the first computing device 150, the mobile computing device 110, the second computing device 160, and/or the third computing device 170.

In step 202, the computing device may determine whether it has permission to monitor device activity on a user device associated with the user (e.g., a mobile device or other device). As previously described, the computing device may be the user device associated with the user. If the computing device has permission to monitor device activity of the user device (step 202: Y), the computing device, in step 204, may detect the device type of the user device. For example, the user device may comprise a mobile phone, a tablet computer, a laptop computer, a desktop computer, a virtual reality headset, or any other user device. The computing device may also detect any input or output devices connected to the user device and useable by the user of the device, such as a mouse, a keyboard, an external display, a controller, or any other input or output devices.

In step 206, the computing device may monitor device activity associated with the user device, which may be based on the device type as determined in step 204. The computing device may monitor device activity across a plurality of the user's devices, such as a mobile phone and a desktop computer. How the computing device monitors a specific user device and the type of data that the computing device collects may be based on the device type of the user device. If the computing device does not have permission to monitor device activity of the user device (step 202: N), the computing device may proceed to step 208, as will be described in further detail below.

Various behavioral characteristics of the user of the user device may be monitored. For example, the computing device may monitor user motion and/or user gait, such as while the user is walking. The user device may comprise a mobile device, such as a mobile phone. The mobile phone may include various sensors, such as a gyro sensor and/or an accelerometer. The sensors may collect movement data as the user is walking and the device is, for example, in the user's possession (e.g., in the user's pocket). The movement data may include, for example, acceleration, orientation, angular velocity, linear velocity, and the like. The mobile device may use the collected movement data to calculate, for example, the user's motion, gait, walking speed, running speed, and/or other characteristics, as the user moves with the mobile device. In some aspects, an application installed and/or running on the mobile device may be used to calculate the behavioral characteristics of the user based on the collected movement data.

In some aspects, behavioral characteristics of the user may comprise, for example, telematics data (e.g., driving data) associated with the user. For example, the sensors of the mobile device (e.g., gyro sensor, accelerometer, and the like) in the vehicle may collect movement data while the user is driving in the vehicle. The mobile device or another computing device may calculate driving data based on the movement data, such as acceleration, vehicle speed, braking rate, or other driving data.

In some aspects, behavioral characteristics of the user may comprise device usage data. For example, a mobile device (e.g., a mobile phone) may use one or more sensors, such as a front-facing camera or an ambient light sensor, to determine how far the user typically holds the device away from the user's face. The mobile device may track one or more gestures performed by the user on, for example, a touchscreen of the mobile device. Gestures may include swiping (e.g., swiping speed or length of swipes), typing (e.g., typing speed), or other gestures on the touchscreen. The mobile device may also track the user's handwriting style or speed on the mobile device, such as when the user uses a stylus or a finger to write on the phone. If the user uses a mouse and/or keyboard to input information into the user's device (e.g., a desktop computer or a mobile device), the device may track how the user uses the mouse and/or keyboard. For example, the device may track the user's mouse scrolling speed, mouse usage patterns, typing speed, etc. Based on the device usage data, the computing device may create a sequence of patterns that is unique to that user. As previously described, an application installed and/or running on the mobile device may be used to calculate the behavioral characteristics of the user based on the collected movement data.

In step 208, the computing device may determine whether it has permission to monitor user location information. User location information may comprise, for example, GPS coordinates (e.g., latitude and longitude), street address, Wi-Fi hotspot-based location information, cell phone tower-based location information, and the like. The location information may also comprise an associated timestamp and/or date that the user was at the location. For example, the location information may indicate that the user was at 233 South Wacker Drive at 11:15:11 on Oct. 10, 2008. The location information may also indicate that the user was at coordinates 41.8764080, −87.6323637 at 12:10:15 on Oct. 10, 2008. A mobile phone may use location services, for example, to obtain the location and/or time information. A user device may additionally or alternatively use IP address information to determine the location of the user. The location information may indicate, for example, the place(s) that the user lives, has lived, or has visited. If the computing device has permission to monitor the user's location (step 208: Y), the computing device, in step 210, may monitor the user's location. For example, the user's mobile phone may track location and/or timestamp information over time (e.g., periodically, occasionally, etc.) and store the information. The computing device may access the location and/or timestamp information and use the information to generate one or more identity tokens for the user, as will be described in further detail below.

In step 212, a computing device associated with a user may determine whether it has received a request, such as from the user, to generate and/or store an identity token (e.g., a new identity token). In some aspects, the request may comprise a request to add a new identity token to the identity chain. The new identity token may be a token for a user that does not yet have an identity token stored on the identity chain. Alternatively, the new identity token may be a token for a user that already has one or more identity tokens stored on the identity chain. The new identity token may be a token that replaces a previous identity token. For example, a previous identity token for a user may have used the user's previous street address (or other outdated information) as a basis. However, the user may have moved and may desire to replace the previous identity token with a new identity token with the user's new street address (or other updated information) as a basis. Alternatively, the new identity token might not be intended to replace the previous token, but might use different identity data from the previous token. Accordingly, users may have a plurality or collection of tokens.

Different types of activities requested by the user (e.g., a transaction, unlocking a mobile device, signing into an account, accessing an application, etc.) may use different tokens. For example, each of the user's identity tokens stored in the identity chain may provide a different level of access for the user. An identity token that uses more identity data (e.g., five pieces of identity data), more types of identity data (e.g., three types of identity data), or more secure identity data (e.g., a fingerprint, a voiceprint, a social security number, etc.) may be more secure and may be used for more important activities (e.g., accessing sensitive corporate data on a mobile device, obtaining a mortgage, etc.). On the other hand, an identity token that uses less identity data (e.g., two pieces of identity data), fewer types of identity data (e.g., one type of identity data), or less secure identity data (e.g., a street address, the user's name, etc.) might be less secure and may be used for less important activities (e.g., purchases that are less than twenty dollars, accessing a social media application, etc.). The more secure identity tokens may also be used for the less important activities.

If the computing device has not received a request to generate and/or store the identity token (step 212: N), the computing device may wait to receive a request to generate an identity token. In the meantime, the computing device may continue to monitor (with permission) device activity and/or user location information, as previously described. If the computing device received a request to generate and/or store the identity token (step 212: Y), the computing device may proceed to step 214.

In step 214, the computing device may determine the identity data to use to generate the identity token. A variety of possible data sets may exist from which a verifiable identity token can be derived. Identity data may comprise, for example, device activity data, user location data, biometric data, history data, profile data, and/or other types of data. In some aspects, the identity data used for the token may comprise data that is persistent (e.g., does not change or is less likely to change over time) and/or unique (e.g., the user is likely the only person to have the information) for data security purposes. In some aspects, a user's first token on the identity chain may be based on identity data that does not change or is less likely to change over time, such as biologic DNA or a fingerprint, rather than identity data that may change over time, such as a home street address. The user may add to the identity chain additional identity tokens that may incorporate identity data that can change over time.

In step 216, the computing device may determine whether to include device activity data in the identity token. As previously described (e.g., with reference to step 202, step 204, and step 206), device activity data may comprise, for example, a user's motion, gait, walking speed, running speed, driving habits, device usage data, etc., which may be measured by one or more sensors of a user device. If the computing device determines to include device activity data in the identity token (step 216: Y), the computing device, in step 218, may retrieve the device activity data. For example, the user's mobile device or other device may have stored the device activity data in local or networked storage. The computing device may transmit a request for the data from the local or networked storage, and the computing device may receive the requested data accordingly.

In step 220, the computing device may determine whether to include user location data in the identity token. As previously described (e.g., with reference to step 208 and step 210), user location data may comprise, for example, locations that the user has visited, along with an associated timestamp. The user location data may also comprise, for example, a home address or a work address, which may be available from a user profile. If the computing device determines to include user location data in the identity token (step 220: Y), the computing device, in step 222, may retrieve the location data, such as from the user's mobile device or from a profile of the user.

In step 224, the computing device may determine whether to include biometric data in the identity token. For example, biometric data may comprise biologic DNA or digital DNA (e.g., fingerprint, voiceprint, retina pattern, facial structure, etc.). In some aspects, a combination of biologic DNA and digital DNA may be used to generate a secure identity token, which may be used for very sensitive activities or transactions. In some scenarios, a thief may be able to obtain one form of identity data from the user, such as biologic DNA, but might not be able to obtain another form of identity data form the user, such as the digital DNA. Biometric data used to generate the user's identity token may also comprise biometric data from another user, such as the user's spouse or the user's business partner.

If the computing device determines to include biometric data in the identity token (step 224: Y), the computing device, in step 226, may generate a request for the biometric data from the user. The computing device may generate the request if, for example, the biometric data is not already available or stored elsewhere, such as on the user's mobile device. The user's device (e.g., a mobile phone or other computer) or a sensor device connected to the user's device may include one or more sensors for collecting biometric data from the user. For example, the user's device may comprise a fingerprint scanner for collecting a fingerprint, a microphone for collecting a voiceprint, a camera for collecting a retina pattern, and/or a camera for capturing an image of the user's facial structure, among other sensors. The user's device may also comprise one or more sensors for collecting and/or analyzing a biological sample taken from the user (e.g., blood sample, tissue sample, bodily fluid sample, hair sample, skin sample, etc.). The user device may display, on a display device associated with the user device, a request for the user to provide the appropriate biometric data. In step 228, the computing device may receive, from the user, biometric data to be included in the identity token, such as a fingerprint, a voiceprint, a DNA sample, and the like.

In step 230, the computing device may determine whether to include history data in the identity token. History data may include, for example, places that the user has lived or visited. History information may also comprise, for example, known contacts of the user, possessions owned by the user (e.g., a house, a car, or other possessions), actions or activities that the user has performed, and other history data. If the computing device determines to include history data in the identity token (step 230: Y), the computing device, in step 232, may retrieve the history data. For example, the computing device may retrieve the history data from the user device, such as a mobile phone, or from a third party data source (e.g., data source 140).

In step 234, the computing device may determine whether to include user profile data in the identity token. User profile data may include, for example, the user's identification numbers, names, etc. If the computing device determines to include user profile data in the identity token (step 234: Y), the computing device, in step 236, may retrieve the profile data. For example, the computing device may retrieve the user profile data from the user device, such as a mobile phone, or from a third party data source (e.g., data source 140).

With reference to FIG. 2B, in step 238, the computing device may generate an identity token based on the selected identity data. A variety of token creation mechanisms may be used and multiple derivations can be stored and verified. The computing device may cryptographically combine the selected identity data, such as using a mathematical transformation, to generate the identity token. For example, blockchain technology may be used to generate the identity token, such as by hashing the identity data. Various cryptographic hash functions may be used, such as MD5, SHA-256, and other hash functions. Various technological benefits may be achieved by using a cryptographic hash function, such as efficiently using processing power, collision resistance, difficulty in determining the input to the hash function from the output, and an output that appears random.

Figure 4:
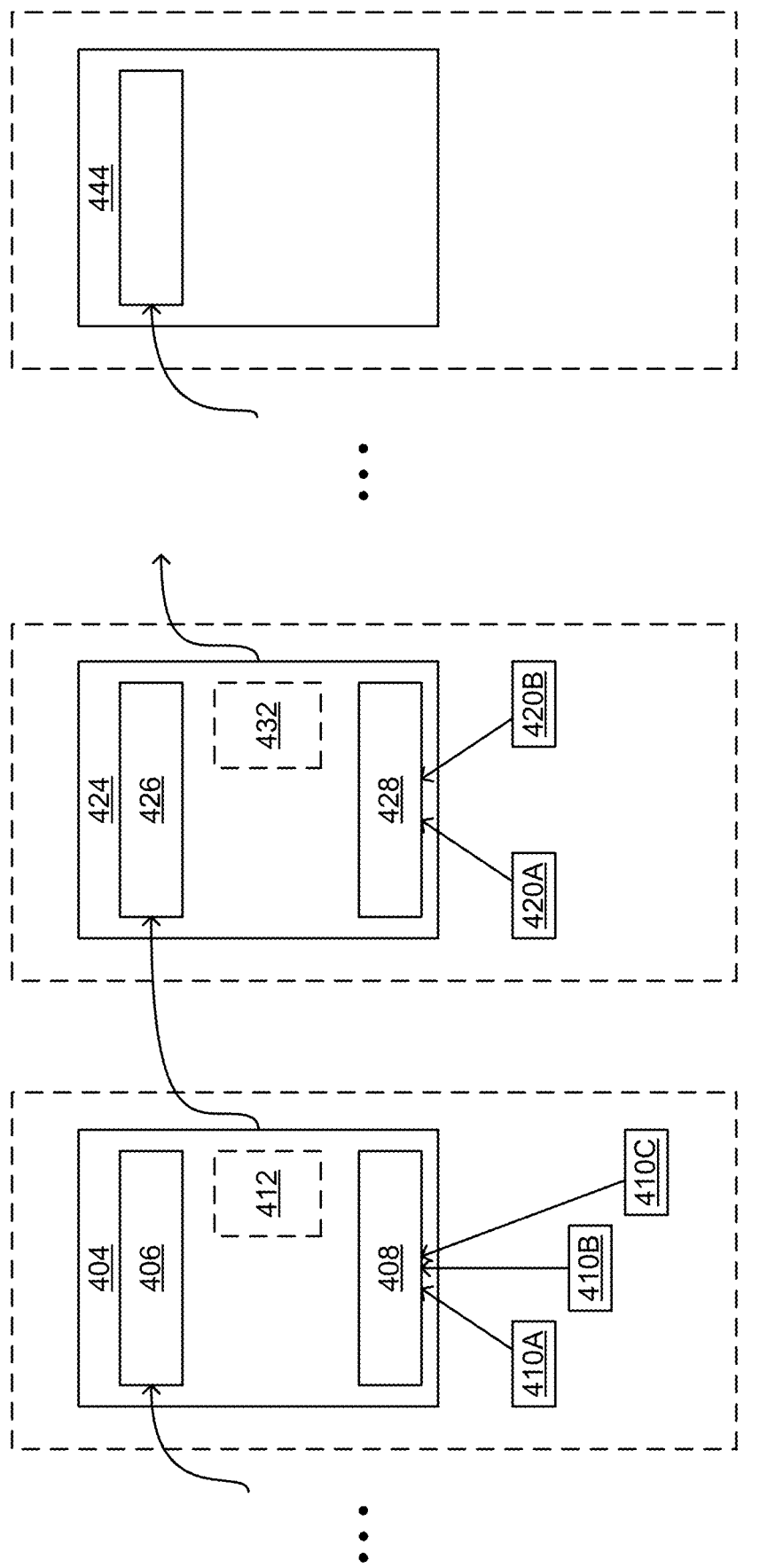
FIG. 4 illustrates an example data structure that may be used to store identity tokens among spatially distributed computing devices according to one or more aspects of the disclosure.

FIG. 4 illustrates an example data structure 400 that may be used to store identity tokens among spatially distributed computing devices according to one or more aspects of the disclosure. The data structure 400 may comprise, for example, a blockchain that is used to store identity tokens. The identity blockchain 400 may comprise a plurality of blocks, such as block 404, block 424, block 444, and other blocks. Each block may represent an identity token for a particular user, such as a participant in the network, and each block may identify the previous block adjacent to it to form a chain. Each block may comprise various pieces of data.

For example, block 404 may comprise a character string 406, such as a hash, of the previous block (not illustrated). Block 404 may also comprise a character string 408 that combines a plurality of pieces of identity data for a user (e.g., identity data 410A, 410B, and 410C). As previously described, identity data may comprise, for example, device activity data, location data, biometric data, history data, profile data, and the like. The identity data 410A, 410B, and 410C may be combined to generate a single character string 408, such as via a hashing technique. For example, identity data 410A may be combined with identity data 410B to generate an intermediate character string. The intermediate character string may then be combined with identity data 410C to generate the character string 408. The character string 408 may comprise a hash of the three pieces of identity data. By combining the identity data 410A, 410B, and 410C before adding the data to the block 404, improved data security may be achieved. For example, the actual identity data might not be accessible to other participants of the block or non-participants.

The block 404 may also comprise a character string 412 that identifies itself. For example, the character string 412 may comprise a hash of the block 404 itself. In some aspects, the character string 412 may be added to the block 404 after a consensus algorithm validates the block 404, as will be described in further detail below. The block 404 may store additional data, such as a nonce or placeholder data. The nonce may be used to verify the block 404, such as via a consensus algorithm.

The identity blockchain 400 may also store a block 424 after block 404 and in response to one or more devices validating the block 424 via a consensus algorithm. Similar to block 404, block 424 may comprise a character string 426, such as a hash, of the previous block (e.g., block 404). Block 424 may also comprise a character string 428 that combines a plurality of pieces of identity data for a user (e.g., identity data 420A and 420B). The identity data 420A and 420B may be combined to generate a single character string 428, such as through a hashing technique. For example, identity data 420A may be hashed with identity data 420B to generate the character string 428. The block 424 may also comprise a character string 432 that identifies itself. For example, the character string 432 may comprise a hash of the block 424 itself. In some aspects, the character string 432 may be added to the block 424 after a consensus algorithm validates the block 424, as will be described in further detail below. A hash of the block 424 may be stored in the next block added to the block chain, and so on.

The identity blockchain 400 may include any number of blocks or tokens, and the tokens may be used to authenticate activities performed by one or more users of the blockchain, as will be described in further detail below. Each user of the identity blockchain 400 may have one token or a plurality of tokens stored on the blockchain 400. For example, token 404 and token 444 may belong to a first user, and token 424 may belong to a second user. As previously described, different tokens may be used for different activities and/or may provide different levels of security. Whatever data set of identity data is selected, the data set may contain direct or derived values that singly or in combination allow the derivation of a unique token that identifies the individual. In other words, two individuals might not be associated with the same token. In some aspects, token values may be immutable (e.g., they do not change over time when recalculated) and may be able to be stored in an immutable fashion (e.g., once stored, the value cannot be changed in the data store). Additionally or alternatively, a verified chain of valid changes may be established so that the current value in the store can be trusted and used to compare to the calculated value.

Returning to FIG. 2B, after the computing device generates the identity token in step 238, the computing device, in step 240, may encrypt the generated identity token. For example, the computing device may sign the token or block with a private key (e.g., a signing key) of the computing device. The computing device may provide the corresponding public key (e.g., a verification key) to other devices in the network of devices, and the other devices may use the public key to verify the signature.

In step 242, the computing device may transmit the identity token to one or more other computing devices in the network of devices. For example, the computing device may broadcast or otherwise publish the identity token to one or more other devices in the network of devices, such as for verification of the identity token by the other devices. If the identity token was signed, the one or more other devices may use a public key corresponding to the signing key to first verify that the identity token came from the computing device. One or more of these devices may also transmit the identity token to other nodes in the network.

In some aspects, one or more consensus algorithms may be used to verify that the identity token belongs to the computing device that generated and originally transmitted the identity token. Using blockchain technology, consensus-based authentication mechanisms can be implemented for verification of the identity token. A new identity token may be added to the identity chain if enough other computing devices in the network (e.g., participants in the identity chain) verify the request to add the new identity token. For example, proof of work may be used as a consensus algorithm to determine whether to add the new identity token (or another identity token) to the identity chain.

One or more of the computing devices in the network may receive the identity token and attempt to verify the identity token and to add it to the identity chain. In some aspects, verification of the identity token may be based on data that the computing device has on the computing device and/or user requesting to add the new identity token. For example, the verifying computing device may have interacted with the requesting computing device in the past, such as completing an activity with the requesting computing device. As will be described in further detail below, activities between computing devices may be stored on an activity data structure (e.g., an activity chain), and the activity chain may be different from the identity chain. The verifying computing device may rely on data from that past interaction (e.g., an activity) to verify the new identity token. That is, the activity chain may be used to update (e.g., add new identity tokens to) the identity chain. The requesting computing device may publish evidence that the new identity token (or value thereof) relates to an identity token (or value thereof) already on the identity chain. The verifying computing device may rely on this published data to verify the new identity token. For example, the requesting computing device may publish information about a purchase of property that links to a bank account that was used by the user of the requesting computing device in a previous transaction with the identity token that is already on the identity chain.

In step 244, one or more of the computing devices in the network of devices may determine whether a threshold number of devices in the network has verified the identity token. For example, consensus that the new identity token is to be added to the identity chain may be based on the number of computing devices in the network that have verified the new token. If the threshold number of devices verifies the identity token (step 244: Y), the method may proceed to step 246. If, on the other hand, the threshold number of devices has not yet verified the identity token (step 244: N), the method may proceed to step 248 to determine whether a timeout for verifying the identity token has occurred. If a timeout has not occurred (step 248: N), the method may return to step 244. If a timeout has occurred (step 248: Y), the system, in step 250, may deny the identity token and might not store the identity token for future use by the associated user. The user may be notified of the denial.

In step 246, the identity token may be stored, such as in the identity chain. With brief reference to FIG. 4, if consensus for block 444 has been reached, block 444 may be added to the identity chain 400. In some aspects, one or more of the computing devices that verified the identity token may store the identity token. In some aspects, the new identity token may be stored once consensus among the computing devices in the network is reached. As will be described in further detail below, the stored identity token may be used to verify the identity of the user, such as if the user desires to perform an activity.

In step 252, the device that stored the identity token may transmit, to one or more other devices in the network of devices, an indication of storage of the identity token. One or more of the devices verifying the identity token may communicate with other devices in the network using a peer-to-peer mechanism. The other devices in the network may similarly store the identity token. By transmitting and storing the same identity blocks and/or identity chain, the network of devices may improve data security of the identity blocks by synchronizing their data. A bad actor may have difficulty attempting to modify the identity chain or individual blocks in the identity chain without the network of devices discovering and preventing the attempt.

According to one or more aspects described herein, identity verification may take place in real time if the value of the identity token can be immediately derived, and the derived value may be compared to the stored and either an immutable original value of the token or a verifiable chain of changed values. Aspects described herein may use unique and immutable tokens that can be verified by a consensus mechanism or may maintain a verifiable chain of trust for changes to the token over time. The use of a blockchain to store the identity tokens may remove the need for a trusted third party and may ensure immutability for the token values. The system might not use a platform operator for the initial creation and subsequent operation of the blockchain. Adequate security protocols may also be used in the implementation of the blockchain(s) to prevent disruption or denial of service. Potential destruction or theft-of-token scenarios may be investigated to ensure that the overall platform is resilient to attacks.

Figure 3A:
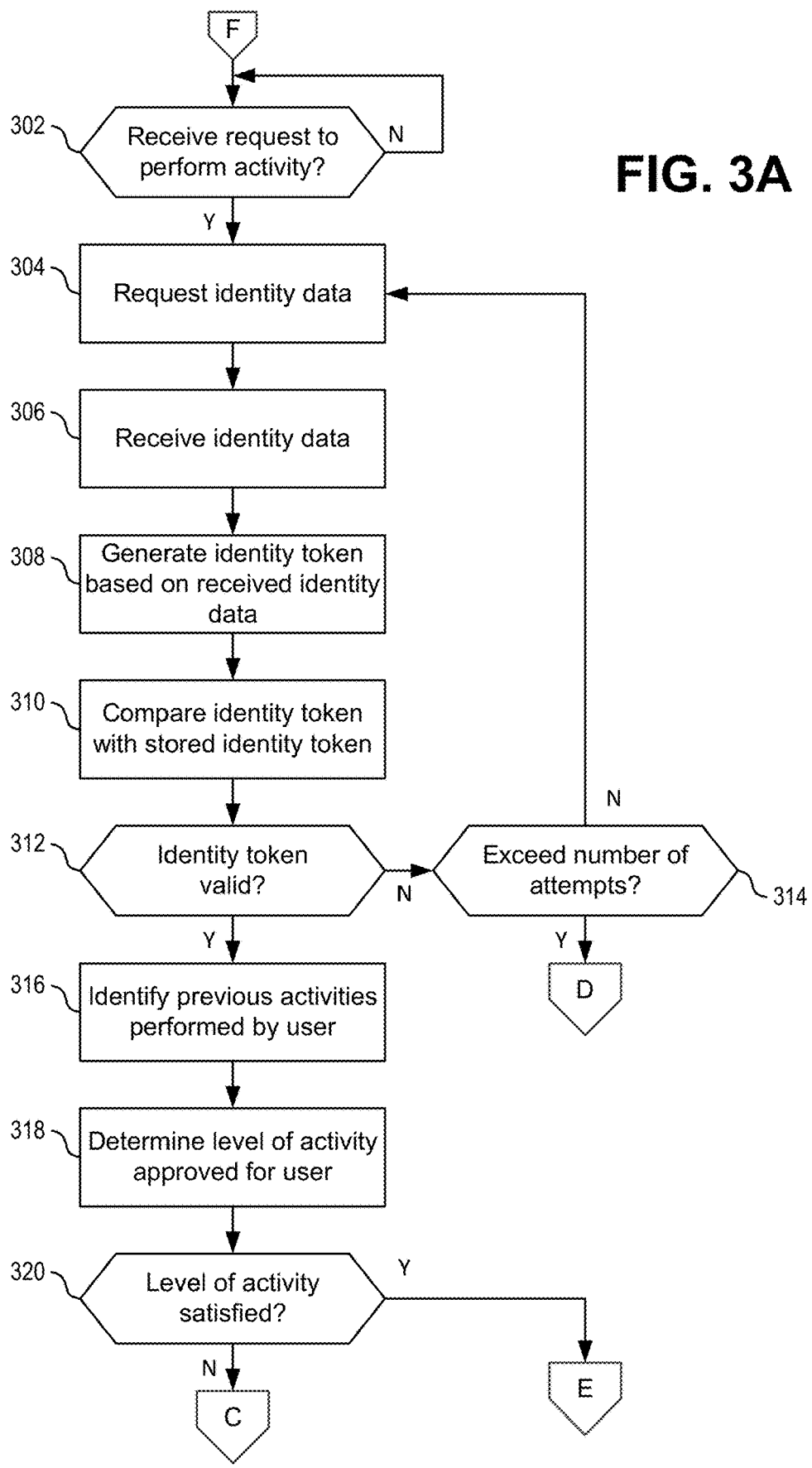
FIGS. 3A-B is a flow diagram illustrating an example method of cryptographically transmitting and storing activity data among spatially distributed computing devices according to one or more aspects of the disclosure.
Figure 3B:
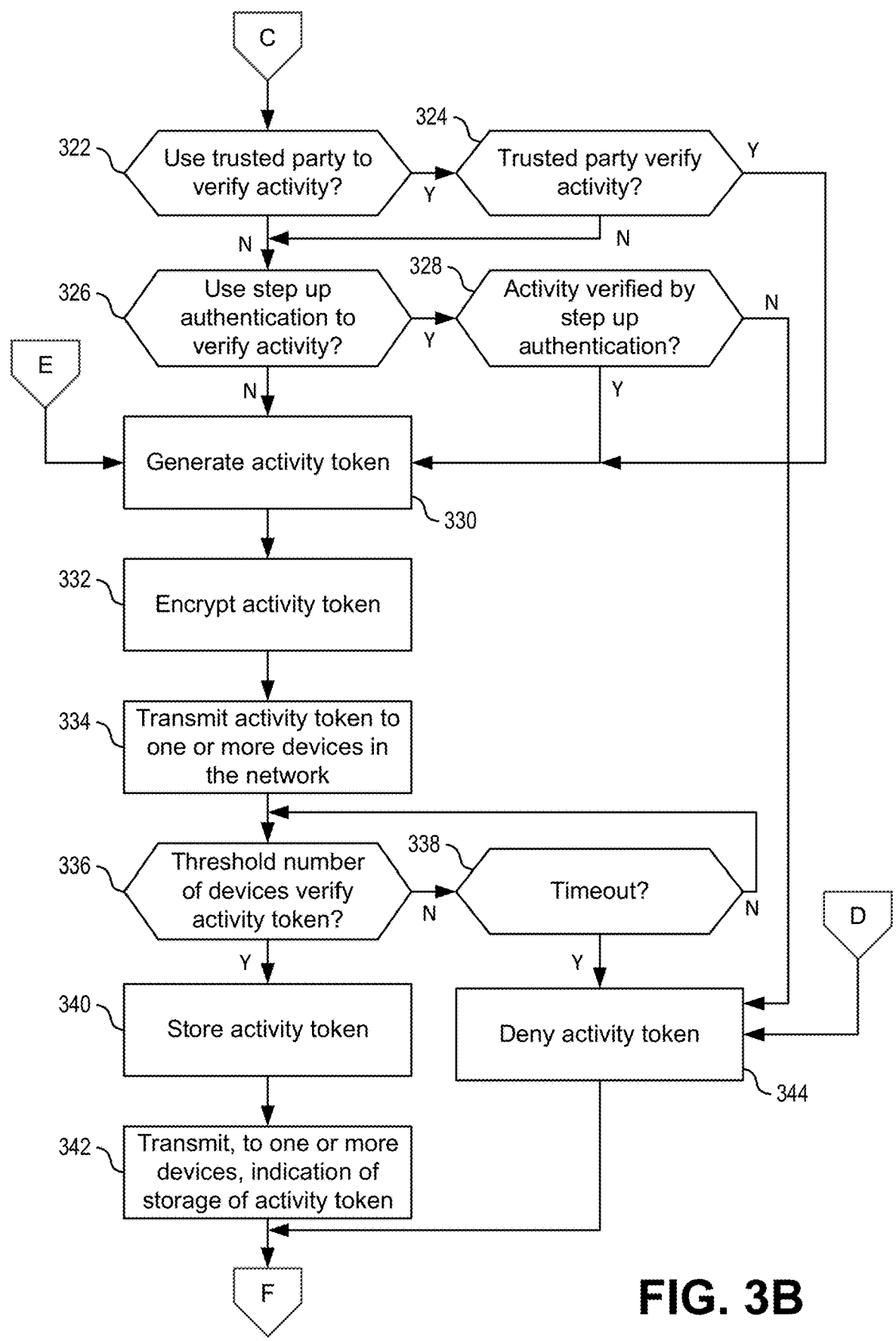

FIGS. 3A-B is a flow diagram illustrating an example method of cryptographically transmitting and storing activity data among spatially distributed computing devices according to one or more aspects of the disclosure. The steps illustrated in FIGS. 3A-B may be performed by one or more of the devices illustrated in FIG. 1, such as the first computing device 150, the mobile computing device 110, the second computing device 160, and/or the third computing device 170.

In step 302, a computing device may determine whether it has received a request to perform an activity. Examples of activities include, but are not limited to, unlocking and using a user device (e.g., a mobile phone, tablet, or laptop), uploading data to a social media network (e.g., a Twitter post), accessing a user profile or account, accessing an application on the phone, performing transactions with other users in the network, etc. In some aspects, the system may permit users to perform activities with other users in the network (e.g., users with identity blocks in the identity chain and/or users with activity blocks in the activity chain), but might not permit users outside of the network to perform activities. If the computing device has not received a request to perform an activity (step 302: N), the computing device may wait for a request to perform an activity. If the computing device has received a request to perform an activity (step 302: Y), the computing device may proceed to step 304.

In step 304, the computing device may request identity data from a user requesting the activity. In some aspects, the identity data requested may correspond to the identity data used to generate an identity token for the user. For example, if one of the user's identity tokens used a home street address, a social security number, and a fingerprint, the computing device may request that the user provide the user's home street address, social security number, and fingerprint. That is, the request may indicate the types of identity data for the user to provide. The computing device may also retrieve other identity data used to generate the identity token and that the user might not be able to provide or that was previously stored on the computing device or available from a third party data source, such as device activity data, locations that the user visited, and the like. The request may be generated on a display associated with the computing device, such as a display of a mobile device or a laptop computer.

In step 306, the computing device may receive the requested identity data, such as from the user or from a data storage location. As previously explained, the computing device may comprise or be connected to a plurality of sensors for collecting identity data, such as biometric data or location data. For example, the computing device may have a fingerprint sensor, a camera with facial recognition software, a DNA sampler, and the like. The sensors may also be provided by, for example, a terminal device that is used to perform a transaction. The user may provide the requested identity data via one or more of the sensors. For example, the user may provide a fingerprint using a fingerprint sensor, a facial scan using a camera and facial recognition software, and/or a voiceprint via a microphone.

In step 308, the computing device (or a terminal device) may generate an identity token based on the received identity data. As previously explained and with brief reference to FIG. 4, identity data (e.g., 410A, 410B, and 410C) may be combined, such as via a hashing algorithm, to generate a character string 408 that encodes the identity data. The computing device (or a terminal device) may use the same algorithm, such as a tokenizer, to attempt to re-create the identity token stored on the identity chain. In some aspects, this may be a real time calculation of the token value at the point of transaction.

In step 310, the computing device may compare the generated identity token with a previously-stored identity token. For example, the computing device may compare the data string generated in step 308 (and based on the identity data provided by the user, retrieved from storage in the computing device, or received from third party data sources) to the data string of the user's identity token recorded in the identity chain.

In step 312, the computing device may determine whether the generated identity token is valid, e.g., based on the comparison. The generated identity token (or value thereof)

may be valid if it matches the identity token (or value thereof) stored in the identity chain. If the identity token is valid (step 312: Y), the computing device may proceed to step 316, as will be described in further detail below. If the identity token is not valid (step 312: N), the computing device may determine, in step 314, whether a number of attempts to provide valid identity data has exceeded a threshold number of attempts. If the number of attempts exceeds the threshold number of attempts (step 314: Y), the method may proceed to step 344 (e.g., denying the activity token), as will be described in further detail below. If the number of attempts does not exceed the threshold number of attempts (step 314: N), the method may return to step 304 to request and receive identity data from the user. The system may again attempt to authenticate, based on received identity data and the identity token stored in the identity chain, the user and the user's requested activity.

In step 316, the computing device may identity previous activities performed by the user. As will be described in further detail below, previous activities performed by the user may be used to authenticate the user and to verify the current, requested activity.

Figure 5:
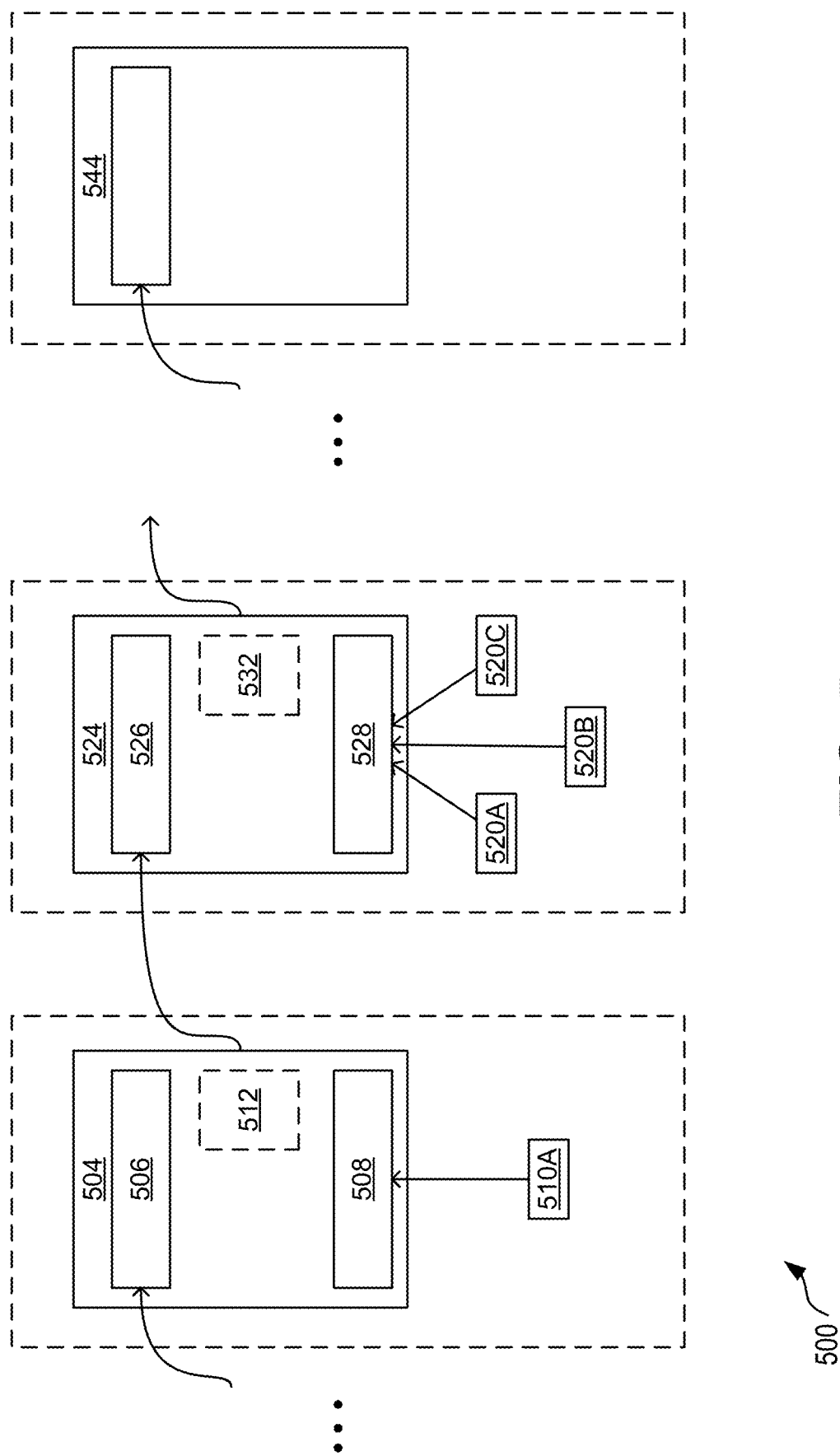
FIG. 5 illustrates an example data structure that may be used to store activity data among spatially distributed computing devices according to one or more aspects of the disclosure.

Any previous activities may be stored on, for example, an activity chain. FIG. 5 illustrates an example data structure 500 that may be used to store activity data among spatially distributed computing devices according to one or more aspects of the disclosure. The data structure 500 may comprise, for example, a blockchain that is used to store activity blocks. The activity blockchain 500 may comprise a plurality of blocks, such as block 504, block 524, block 544, and other blocks. Each block may represent an activity for a particular user, such as a participant in the network, or an activity between two or more users. Each block may also identify the previous block adjacent to it to form a chain. Each block may comprise various pieces of data. For example, block 504 may comprise a character string 506, such as a hash, of the previous block (not illustrated). Block 504 may also comprise a character string 508 that combines a plurality of pieces of activity data for a user (e.g., activity data 510A). The activity data 510A may be combined with other activity data to generate a single character string 508, such as through a hashing technique. Activity data 510A may also be hashed by itself to generate the character string 508. By hashing the activity data 510A before adding the data to the block 504, improved data security may be achieved. The actual activity data might not be accessible to other participants of the blockchain.

The block 504 may also comprise a character string 512 that identifies itself. For example, the character string 512 may comprise a hash of the block 504 itself. In some aspects, the character string 512 may be added to the block 504 after a consensus algorithm validates the block 504, as will be described in further detail below. The block 504 may store additional data, such as a nonce or placeholder data. The nonce may be used to verify the block 504, such as via a consensus algorithm.

The activity blockchain 500 may also store a block 524 after block 504 and in response to one or more devices validating the block 524 via a consensus algorithm. Similar to block 504, block 524 may comprise a character string 526, such as a hash, of the previous block (e.g., block 504). Block 524 may also comprise a character string 528 that combines a plurality of pieces of activity data for a user or multiple users (e.g., activity data 520A, 520B, and 520C). The activity data 520A, 520B, and 520C may be combined to generate a single character string 528, such as through a hashing technique. For example, activity data 520A may be hashed with activity data 520B to generate an intermediate string. The intermediate string may be hashed with activity data 520C to generate the character string 528. The block 524 may also comprise a character string 532 that identifies itself. For example, the character string 532 may comprise a hash of the block 524 itself. In some aspects, the character string 532 may be added to the block 524 after a consensus algorithm validates the block 524, as will be described in further detail below. A hash of the block 524 may be stored in the next block added to the block chain, and so on.

The activity blockchain 500 may include any number of blocks, and the blocks may be used to record the activity and to authenticate other activities performed by one or more users of the blockchain, as will be described in further detail below. Each user of the activity blockchain 500 may have multiple activity blocks stored on the blockchain 500. The order of the activity blocks may be based on the order that the activity blocks are verified by a consensus algorithm. In some aspects, blocks may be immutable (e.g., they do not change over time when recalculated) and may be able to be stored in an immutable fashion (e.g., once stored, the value cannot be changed in the data store). Additionally or alternatively, a verified chain of valid changes may be established so that the current value in the store can be trusted and used to compare to the calculated value.

Returning to FIG. 3A, in step 318, the computing device may determine a level of activity approved for the user. The level of activity approved for the user may be based on the number or type of activities previously performed by the user (and stored in the blockchain 500) and/or the amount of identity data used for the identity token used to authenticate the user for the activity. The more activities completed by the user and stored on the blockchain 500, the higher the level of activity the user may be approved for (e.g., obtaining a mortgage, accessing secured corporate resources, etc.). Similarly, the more identity data or types of identity data used for the identity token, the higher the level of activity the user may be approved for. On the other hand, users that have performed fewer activities or provided less identity data may be approved for lower levels of activity (e.g., purchasing an item that costs less than $15, logging in to a mobile device application, etc.). As previously explained, a user may have a plurality of identity tokens stored on the identity chain, and the type of activity or value of the activity may be used to determine which token to use. For example, a low value activity may use an identity token generated from a single biometric, whereas a high value activity may use an identity token generated from a plurality of biometrics (e.g., iris scan, fingerprint scan, DNA, etc.). By using different tokens that may require different levels of processing power to compute, the system may more efficiently authenticate the user based on an appropriate level of identity data.

In step 320, the computing device may determine whether the requested activity satisfies the level of activity approved for the user. If the requested activity satisfies the level of activity approved for the user (step 320: Y), the method may proceed to step 330 (e.g., generating an activity token), as will be described in further detail below. For example, if the computing device or user has completed many activities in the past (e.g., has many blocks in the activity blockchain) and/or has provided many pieces of identity data that match the identity token, the other computing devices in the network may quickly verify the activity based on the past activities or complex identity token. If the requested activity does not satisfy the level of activity approved for the user (step 320: N), the method may proceed to step 322, as will be described in further detail below. For example, the computing device or user might not have any past activities or might have only a few past activities recorded in the activity chain. Additionally or alternatively, the computing device or user might have used less identity data to generate the identity token. In these examples, the system may attempt to use additional authentication mechanisms to authenticate the user.

In some aspects, a new user may be added to the activity chain on probationary terms or in a probationary period. For example, the user may initially be approved to perform lower level transactions (e.g., less money or certain types of low level transactions). At some point, the user may be removed from the probationary period, based on the number of transactions that the user completes (e.g., enough of the user's transactions with other members in the network have been approved). Other mechanisms for authenticating a user with few activities exist.

With reference to FIG. 3B, in step 322, the computing device may determine whether to use a trusted party (e.g., a bank or other trusted third party) to verify the requested activity. If the computing device determines not to use a trusted party to verify the activity (step 322: N), the computing device may proceed to step 326, as will be described in further detail below. If the computing device determines to use a trusted party to verify the activity (step 322: Y), the computing device may proceed to step 324.

In step 324, the trusted party may attempt to verify the activity. For example, the user may provide identity information (e.g., biometric data, personal data, etc.) to the trusted party, and the trusted party may authenticate the user. The user may physically visit a location of the trusted party (e.g., a bank), and the trusted party may authenticate the user based on the physical visit. If the trusted party verifies the activity (step 324: Y), the method may proceed to step 330 to generate an activity token, as will be described in further detail below. Alternatively, the method may proceed to step 326 to determine whether to use step up authentication to verify the activity. If the trusted party does not verify the activity (step 324: N), the method may proceed to step 326 to determine whether to use step up authentication to verify the activity.

In step 326, the computing device may determine whether to use step up authentication to verify the activity. For example, the computing device may request that the user provide certain types of information, such as a username/password, a PIN code, a driver's license number, etc. The requested information may be identity data used to generate one of the user's identity tokens or may be other identity data not used in the user's tokens. If the computing device determines not to use step up authentication to verify the activity (step 326: N), the computing device may proceed to step 330 to generate an activity token, as will be described in further detail below. Alternatively, the computing device may proceed to step 344 to deny the activity token if, for example, the user is not authenticated by a trusted party or by step up authentication. If the computing device determines to use step up authentication to verify the activity (step 326: Y), the computing device may proceed to step 328.

In step 328, the system may attempt to authenticate the user, using step up authentication, such as by requesting additional identifying information from the user. If the activity is verified by step up authentication (step 324: Y), the method may proceed to step 330 to generate an activity token, as will be described in further detail below. If the activity is not verified by step up authentication (step 324: N), the method may proceed to step 344 to deny the activity token.

In step 330, the computing device may generate an activity token based on activity data (e.g., transaction information). A variety of token creation mechanisms may be used and multiple derivations can be stored and verified. As previously described with reference to FIG. 5, the computing device may cryptographically combine the activity data, such as using a mathematical transformation, to generate the activity token. For example, blockchain technology may be used to generate the activity token, such as by hashing the activity data. Various cryptographic hash functions may be used, such as MD5, SHA-256, and other hash functions. Various technological benefits may be achieved by using a cryptographic hash function, such as efficiently using processing power, collision resistance, difficulty in determining the input to the hash function from the output, and an output that appears random.

After the computing device generates the activity token in step 330, the computing device, in step 332, may encrypt the activity token. For example, the computing device may sign the token or block with a private key (e.g., signing key) of the computing device. The computing device may provide the corresponding public key (e.g., a verification key) to other devices in the network of devices, and the other devices may use the public key to verify the signature.

In step 334, the computing device may transmit the activity token to one or more computing devices in the network of computing devices. For example, the computing device may broadcast or otherwise publish the activity token to one or more other devices in the network of devices, such as for verification of the activity token. If the activity token was signed, the one or more other devices may use a public key corresponding to the signing key to first verify that the activity token came from the computing device. One or more of these devices may also transmit the activity token to other nodes in the network.

In some aspects, one or more consensus algorithms may be used to verify that the activity token is to be added to the activity chain. Using blockchain technology, consensus-based authentication mechanisms can be implemented for verification of the activity token. A new activity token may be added to the activity chain if enough other computing devices in the network (e.g., participants in the activity chain) verify the request to add the new activity token. For example, proof of work may be used as a consensus algorithm to determine whether to add the new activity token to the activity chain.

One or more of the computing devices in the network may receive the activity token and attempt to verify the activity token and to add it to the activity chain. In some aspects, verification of the activity token may be based on data that the computing device has on the computing device and/or the user requesting to add the new activity token. For example, the verifying computing device may have interacted with the requesting computing device in the past, such as completing an activity with the requesting computing device. The verifying computing device may rely on data from the past activity to verify the new activity.

In step 336, one or more of the computing devices in the network of devices may determine whether a threshold number of devices in the network has verified the activity token. For example, consensus that the new activity token is to be added to the activity chain may be based on the number of computing devices in the network that have verified the new token. If the threshold number of devices verifies the activity token (step 336: Y), the method may proceed to step 340. If, on the other hand, the threshold number of devices has not yet verified the activity token (step 336: N), the method may proceed to step 338 to determine whether a timeout for verifying the activity token has occurred. If a timeout has not occurred (step 338: N), the method may return to step 336. If a timeout has occurred (step 338: Y), the system, in step 344, may deny the activity token and might not store the activity token. For example, the user or computing device may be known to have been in New York 10 minutes ago (e.g., based on a previously stored activity block), but the current, new activity may have originated in Los Angeles. Thus the new activity may be denied based on the previously stored activity block indicating that the user is in New York.

In step 340, the activity token may be stored, such as in the activity chain. For example, one of the computing devices that verified the activity token may store the activity token. The method of verifying the user and/or the activity may also be stored in the activity token. With brief reference to FIG. 5, if consensus for block 544 has been reached, block 544 may be added to the activity chain 500. In some aspects, one or more of the computing devices that verified the activity token may store the activity token in the chain. In some aspects, the new activity token may be stored once consensus among the computing devices in the network is reached. The stored activity token may be used to record the fact of the activity and, in some instances, may be used to verify future activities requested by the computing device or user of the computing device. Accordingly, each confirmed activity may be trust strengthening for the user(s) involved in the activity. A mature activity history may allow uses to more easily prove their identities. As a user or computing device participates in more activities, the consensus process can use the participation history as additional verification data. By combining multiple token derivation methods, and/or the application of a consensus verification process, the risk of impersonation or the use of a stolen or misappropriated token may be significantly reduced.

In step 342, the device that stored the activity token may transmit, to one or more other devices in the network of devices, an indication of storage of the activity token. For example, one or more of the devices verifying the activity token may communicate with other devices in the network using a peer-to-peer mechanism. The other devices in the network may similarly store the activity token. By transmitting and storing the same activity blocks and/or activity chain, the network of devices may improve data security of the activity blocks by synchronizing their data. A bad actor may have difficulty attempting to modify the activity chain or individual blocks in the activity chain without the network of devices discovering and preventing the attempt.

In some aspects, the identity chain and/or activity chain may be made up of the sum of personal mobile devices of the participants in the verification service. For example, the user's mobile devices may act as nodes in a blockchain—a mesh in which the system may distribute the work of the blockchain. The mobile devices may also store the activity chain and/or identity chain (and the blocks therein). This may enable a crowd chain, with each device contributing some storage and processing capacity for both tokens and the consensus-based verification process. The number of participants may be controlled to ensure sufficient redundancy of the stored tokens and capacity to support point of activity verification requirements.

Figure 6:
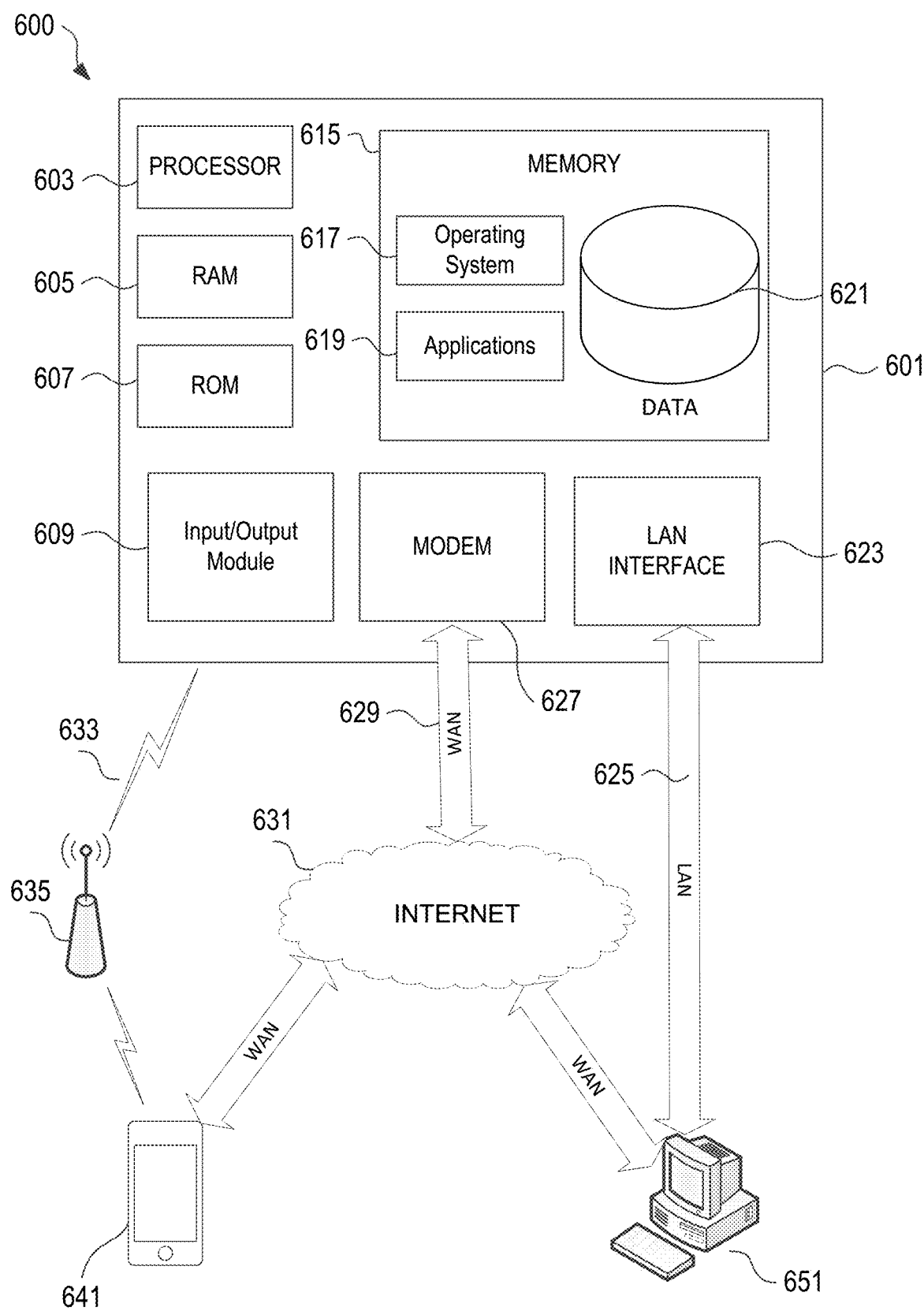
FIG. 6 illustrates a network environment and computing systems that may be used to implement aspects of the disclosure.

FIG. 6 illustrates a block diagram of a computing device 601 in a spatially distributed computing system 600 that may be used according to one or more illustrative embodiments of the disclosure. The computing device 601 may have a processor 603 for controlling overall operation of the computing device 601 and its associated components, including RAM 605, ROM 607, input/output module 609, and memory unit 615. The computing device 601, along with one or more additional devices (e.g., terminals 641, 651) may correspond to any of multiple systems or devices, such as spatially distributed computing devices or systems, configured as described herein for cryptographically transmitting and storing identity tokens and/or activity data among spatially distributed computing devices.

Input/Output (I/O) module 609 may include a microphone, keypad, touch screen, and/or stylus through which a user of the computing device 601 may provide input, and may also include one or more of a speaker for providing audio input/output and a video display device for providing textual, audiovisual and/or graphical output. Software may be stored within memory unit 615 and/or other storage to provide instructions to processor 603 for enabling device 601 to perform various functions. For example, memory unit 615 may store software used by the device 601, such as an operating system 617, application programs 619, and an associated internal database 621. The memory unit 615 includes one or more of volatile and/or non-volatile computer memory to store computer-executable instructions, data, and/or other information. Processor 603 and its associated components may allow the computing device 601 to execute a series of computer-readable instructions to cryptographically transmit and store identity tokens and/or activity data among spatially distributed computing devices.

The computing device 601 may operate in a networked environment 600 supporting connections to one or more remote computers, such as terminals/devices 641 and 651. The computing device 601, and related terminals/devices 641 and 651, may include devices installed in ground, air, or space vehicles or mobile devices that are configured to receive and process image and external data. Thus, the computing device 601 and terminals/devices 641 and 651 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 601. The network connections depicted in FIG. 6 include a local area network (LAN) 625 and a wide area network (WAN) 629, and a wireless telecommunications network 633, but may also include other networks. When used in a LAN networking environment, the computing device 601 may be connected to the LAN 625 through a network interface or adapter 623. When used in a WAN networking environment, the device 601 may include a modem 627 or other means for establishing communications over the WAN 629, such as network 631 (e.g., the Internet). When used in a wireless telecommunications network 633, the device 601 may include one or more transceivers, digital signal processors, and additional circuitry and software for communicating with wireless computing devices 641 (e.g., mobile phones, short-range vehicle communication systems, vehicle sensing and telematics \devices) via one or more network devices 635 (e.g., base transceiver stations) in the wireless network 633.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and spatially distributed computing device components described herein may be configured to communicate using any of these network protocols or technologies.

Additionally, one or more application programs 619 used by the computing device 601 may include computer executable instructions (e.g., cryptographic algorithms, and the like) for cryptographically transmitting and storing identity tokens and/or activity data among spatially distributed computing devices.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
   receiving, by a computing device, a request associated with a user to perform an activity;
   in response to receiving the request associated with the user to perform the activity, requesting, by the computing device, identity data associated with the user;
   receiving, by the computing device, the identity data associated with the user;
   generating, by the computing device and based on the identity data associated with the user, an identity token for the user;
   in response to authenticating, by the computing device, the user based on the identity token, generating, by the computing device, an activity token for the user;
   transmitting, by the computing device and to a plurality of other computing devices, the activity token for the user;
   determining, by the computing device, a number of computing devices, of the plurality of other computing devices that verified the activity token;
   based on a determination that the number of computing devices is above a threshold number of computing devices, storing, by the computing device, the activity token for the user in an activity chain, wherein the activity token for the user indicates a prior activity token stored in the activity chain; and
   transmitting, by the computing device and to the plurality of other computing devices, an indication of the storing the activity token.

2. The method of claim 1, further comprising:
   determining previous activities performed by the user; and
   determining a level of activity for the user based on the previous activities.

3. The method of claim 2, wherein the activity token is generated based on a determination that the activity meets the level of activity.

4. The method of claim 1, wherein the activity token is generated by cryptographically combining previous activity data associated with the user.

5. The method of claim 1, further comprising:
   encrypting the activity token.

6. The method of claim 5, further comprising:
   transmitting, by the computing device and to the plurality of other computing devices, a corresponding public key.

7. The method of claim 1, wherein the computing device and the plurality of other computing devices form a network of trusted computing devices.

8. A computing device comprising:
   a processor; and
   memory storing computer-executable instructions that, when executed by the processor, cause the computing device to:
   receive a request associated with a user to perform an activity;
   in response to receiving the request associated with the user to perform the activity, request identity data associated with the user;
   receive the identity data associated with the user;
   generate, based on the identity data associated with the user, an identity token for the user;
   in response to authenticating the user based on the identity token, generate an activity token for the user;
   transmit, to a plurality of other computing devices, the activity token for the user;
   determine a number of computing devices, of the plurality of other computing devices that verified the activity token;
   based on a determination that the number of computing devices is above a threshold number of computing devices, store the activity token for the user in an activity chain, wherein the activity token for the user indicates a prior activity token stored in the activity chain; and
   transmit, to the plurality of other computing devices, an indication of the storing the activity token.

9. The computing device of claim 8, wherein the memory stores computer-executable instructions that, when executed by the processor, causes the computing device to
   determine previous activities performed by the user; and
   determine a level of activity for the user based on the previous activities.

10. The computing device of claim 9, wherein the activity token is generated based on a determination that the activity meets the level of activity.

11. The computing device of claim 9, wherein the computing device and the plurality of other computing devices form a network of trusted computing devices.

12. The computing device of claim 8, wherein the activity token is generated by cryptographically combining previous activity data associated with the user.

13. The computing device of claim 8, wherein the memory stores computer-executable instructions that, when executed by the processor, causes the computing device to:
    encrypt the activity token.

14. The computing device of claim 13, wherein the memory stores computer-executable instructions that, when executed by the processor, causes the computing device to:
    transmit, to the plurality of other computing devices, a corresponding public key.

15. The computing device of claim 8, wherein the computing device and the plurality of other computing devices form a network of trusted computing devices.

16. A system comprising:
    a computing device; and
    a plurality of other computing devices,
    wherein the computing device is configured to:
    receive a request associated with a user to perform an activity;

in response to receiving the request associated with the user to perform the activity, request identity data associated with the user;
receive the identity data associated with the user;
generate, based on the identity data associated with the user, an identity token for the user;
in response to authenticating the user based on the identity token, generate an activity token for the user;
transmit, to the plurality of other computing devices, the activity token for the user;
determine a number of computing devices, of the plurality of other computing devices that verified the activity token;
based on a determination that the number of computing devices is above a threshold number of computing devices, store the activity token for the user in an activity chain, wherein the activity token for the user indicates a prior activity token stored in the activity chain; and transmit, to the plurality of other computing devices, an indication of the storing the activity token.

17. The system of claim 16, wherein the computing device is configured to: determine previous activities performed by the user; and
determine a level of activity for the user based on the previous activities,
wherein the activity token is generated based on a determination that the activity meets the level of activity.

18. The system of claim 16, wherein the activity token is generated by cryptographically combining previous activity data associated with the user.

19. The system of claim 16, wherein the computing device is configured to:
encrypt the activity token.

20. The system of claim 16, wherein the computing device and the plurality of other computing devices form a network of trusted computing devices.

* * * * *